Patented Nov. 7, 1922.

1,435,057

UNITED STATES PATENT OFFICE.

JOSEPH EPPING, OF QUINCY, ILLINOIS.

CURING FLESH MEATS.

No Drawing.   Application filed January 16, 1922.   Serial No. 529,727.

*To all whom it may concern:*

Be it known that I, JOSEPH EPPING, of Quincy, in the county of Adams and State of Illinois, have invented certain new and useful Improvements in Curing Flesh Meats; and I do hereby declare the following to be a full, clear, and exact description of the invention, such as will enable others skilled in the art to which it appertains to make and use the same.

My invention relates to a composition of matter for use in curing flesh meats, and the object of the invention is to prepare a compound which is applied to a first lot of the material to be cured, such as bacon, and by its action thereon producing a pickle which is effective to more rapidly and economically cure the bacon, at the same time giving to the latter a better flavor, than is obtained with known compounds in pickling processes, the pickle so produced being usable for future lots of the material for an extended period.

In the curing of bacon as at present practised a pickle is prepared and the bacon placed therein where it must remain for about thirty days. By my improved compound the pickle is partly self produced by the juices of the meat and this pickle may be repeatedly used with quicker results in the curing process than heretofore obtained. For each 100 pounds of the meat I mix 2 pounds of cane sugar, 3 pounds of coarse salt and 1 pound of zero pickle (containing about 70% saltpetre and 30% salt). This mixture in a dry state is then applied to the fresh flesh meat and causes an exudation of a large percentage of the juices of the meat, and which, commingling with the sugar, salt and zero pickle, in the proportions stated, forms a pickle. After this first lot of material has been cured the pickle is used for subsequent lots, retaining the necessary curing properties for a long period of time.

The advantages of my invention will be apparent. With known compounds and pickling processes it is necessary to prepare a fresh pickle for each batch of bacon, whereas in the use of my improved compound this expense and delay is avoided. It is further to be noted that the pickle resulting from a use of the described compound causes less shrinkage in weight of the material than with customary curing.

I claim as my invention:

1. In the art of curing flesh meats, applying a mixture of 2 pounds of cane sugar, 3 pounds of coarse salt, and 1 pound of a compound of 70% saltpetre and 30% salt to 100 pounds of the material to be cured to cause exudation of the juices therefrom and their commingling with such mixture to form a pickling compound.

2. A pickling compound for use in curing flesh meats comprising a mixture of 2 pounds of cane sugar, 3 pounds of coarse salt, 1 pound of a compound of 70% saltpetre and 30% salt, and the juice of 100 pounds of fresh meat.

In testimony whereof I have signed this specification.

JOSEPH EPPING.